United States Patent [19]
Yamazaki

[11] Patent Number: 4,903,342
[45] Date of Patent: Feb. 20, 1990

[54] OPTICAL HETERODYNE HOMODYNE DETECTION APPARATUS

[75] Inventor: Shuntaro Yamazaki, Tokyo, Japan
[73] Assignee: NEC Corporation, Tokyo, Japan
[21] Appl. No.: 263,216
[22] Filed: Oct. 27, 1988

[30] Foreign Application Priority Data
Oct. 27, 1987 [JP] Japan .................. 62-271224

[51] Int. Cl.$^4$ .............................. H04B 9/00
[52] U.S. Cl. .................. 455/619; 455/616
[58] Field of Search .......... 455/600, 606, 607, 617, 455/619, 616

[56] References Cited
FOREIGN PATENT DOCUMENTS
0101130 5/1986 Japan .................. 455/601
0010937 1/1987 Japan .................. 455/616
8607513 12/1986 World Int. Prop. O. .......... 455/612

*Primary Examiner*—Robert L. Griffin
*Assistant Examiner*—L. Van Beek
*Attorney, Agent, or Firm*—Sughrue, Mion, Zinn, Macpeak & Seas

[57] ABSTRACT

In an optical heterodyne homodyne detection apparatus, signal light and local oscillation light are combined, and the combined light is received in an optical detector to produce intermediate frequency signal which is then demodulated thereby producing base band signals. The frequency sweep of the intermediate frequency signal is performed so that the frequency of the intermediate frequency signal becomes a predetermined value. During the frequency sweep, at least one polarization of the signal light and the intermediate frequency signal is scrambled, and is stopped when the frequency becomes the predetermined value. Thereafter, polarizations of the signal light and the local oscillation light are coincided with each other in accordance with the polarization angle control.

2 Claims, 2 Drawing Sheets

OPTICAL HETERODYNE HOMODYNE DETECTION APPARATUS

FIELD OF THE INVENTION

The invention relates to an optical heterodyne homodyne detection apparatus, and more particularly to an optical heterodyne homodyne detection apparatus in which polarizations of signal light and/or local oscillation light are scrambled to coincide with each other.

BACKGROUND OF THE INVENTION

An optical heterodyne detection communication system in which a coherent light optical fiber is used has an advantage that a long distance and high density transmission can be performed because a receiving sensitivity is remarkably high, and a frequency utilizing efficiency is also high, as compared to a direct detection communication system in which an intensity of light is modulated. The optical heterodyne detection communication system is described in a report entitled "a coherent light optical fiber transmission demodulation technology—FSK heterodyne detection" in "The Practical Report, Vol 31, No. 12, 1982" published by Nippon Telegraph and Telephone Corp.

In the coherent light communication, signal light supplied from an optical transmitter is coupled with light supplied from a local oscillation light source to provide combined light which is then received in an optical detector. As a result, beat signal corresponding to the difference of frequencies between the signal light and the local oscillation light is produced in the optical detector as electric signal of intermediate frequency. Then, the intermediate frequency signal is demodulated to produce base band signal. For the purpose of stabilizing frequency and level of the intermediate frequency signal which tend to fluctuate due to the fluctuation of frequency difference between the signal light and the local oscillation light and to the incoincidence of polarizations thereof, the frequency and polarization of the local oscillation light are controlled to synchronize with the fluctuation of the center frequency and polarization of the signal light. Such a control for the stabilization of the frequency and level of the intermediate frequency signal is also adopted in a freqnecy division multiplexed transmission system. That is, the frequency sweep of local oscillation light is performed to pull beat signal of a predetermined channel into an intermediate frequency band, and the above mentioned frequency and polarization control is then performed in a case where the predetermined channel is selectively received from frequency division multiplexed signals.

In the optical heterodyne detection communication system, however, there is a disadvantage that, in a case where frequency division multiplexed signals of, for instance, two channels having polarizations orthogonal to each other are received, beat signal of a first channel to which a second channel is changed-over is not detected, thereby making it impossible to pull the beat signal into intermediate signal band, even if the frequency sweep of local oscillation light is performed to change-over from the second channel to the first channel. In regard to this disadvantage, a probability of not detecting the beat signal is increased in proportional to the number of channels.

SUMMARY OF THE INVENTION

Accordingly, it is an object of the invention to provide an optical heterodyne homodyne detection apparatus in which a predetermined channel is selectively received without being affected by the condition of polarizations of signal light and local oscillation light.

According to the invention, an optical heterodyne homodyne detection apparatus comprises a frequency sweeping means for a local oscillation light source, a polarization scrambling means for local oscillation light and/or signal light, a polarization angle control means for the local oscillation light and/or the signal light, an intermediate frequency signal producing means, and a controller for the above described means. The frequency sweeping means and the polarization scrambling means are controlled by the controller, so that the frequency sweep and the polarization scrambling are performed, and stopped when frequency of the intermediate frequency signal becomes a predetermined value. Thereafter, the polarization angle control is performed to coincide polarizations of the signal and local oscillation lights.

BRIEF DESCRIPTION OF DRAWINGS

The invention will be explained in more detail in conjunction with appended drawings wherein.

DESCRIPTION OF PREFERRED EMBODIMENTS

Figure 1:
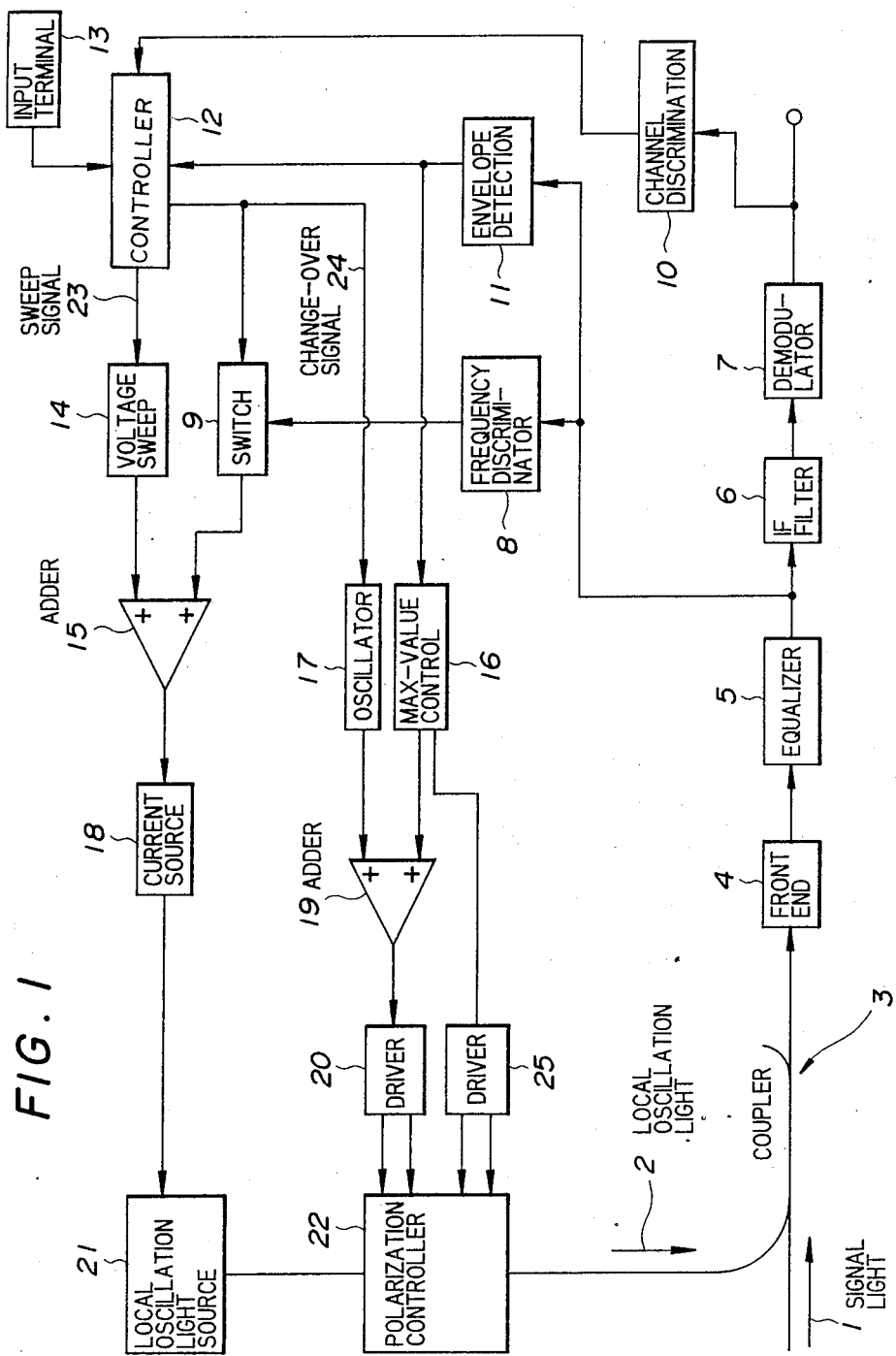
FIG. 1 is a block diagram showing a first embodiment according to the invention.

In FIG. 1, there is shown an optical heterodyne detection apparatus of 10 channel frequency division multiplexed frequency shift keying in the first embodiment according to the invention. The optical heterodyne detection apparatus comprises an optical coupler 3 for combining signal light 1 and local oscillation light 2, a front end 4 of a PIN-FET optical detector, an equalizer 5, an IF filter 6, and a demodulation circuit 7. The local oscillation light 2 is supplied through a polarization controller 22 from a local oscillation light source 21. The local oscillation light source 21 is controlled by a first control system including a voltage sweep circuit 14 connected to a controller 12, a switch 9 to which output of a frequency discriminator 8 is applied, a first adder 15 to which the voltage sweep circuit 14 and the switch 9 are connected, and a current source 18. The voltage sweep circuit 14 holds output voltage at a very moment when a sweep signal 23 supplied from the controller 12 is "0". The polarization controller 22 is controlled by a second control system including a maximum value control circuit 16 to which output of an envelope detection circuit 11 is supplied, an oscillator 17, a second adder 19 to which the maximum value control circuit 16 and the oscillator 17 are connected, a first driver 20 to which the second adder 19 is connected, and a second driver 25 to which the maximum value control circuit 16 is connected. The controller 12 is supplied with outputs of a channel discrimination circuit 10, the envelope detection circuit 11, and an input terminal 13, so that the sweep signal 23 and a change-over signal 24 are produced in the controller 12.

In operation, when the frequency division multiplexed signal light 1 of 10 channels are supplied through a single mode optical fiber from an optical transmitter (not shown), the signal light is combined in the optical coupler 3 with the local oscillation light 2. The combined light is supplied to the front end 4 and converted therein to electric signals. Intermediate frequency signal which is output of the front end 4 is beat signal of a channel selected from the 10 channels, and is equalized in the equalizer 5. The intermediate frequency signal thus equalized is divided into three signals supplied to the IF filter 6, the frequency discriminator 8, and the envelope detection circuit 11 respectively. One of the three signals is passed through the IF filter 6 in which noise is removed from the signal, and base band signal is obtained in the demodulator 7 in accordance with the demodulation thereof. In the envelope detection circuit 11 which is a power detection circuit utilizing a scare characteristic of a double-balanced mixer, the presence and non-presence of intermediate frequency signal is detected, and the power of the intermediate frequency signal is detected in case of the presence thereof. Output of the envelope detection circuit 11 is supplied to the controller 12 and the maximum value control circuit 16. On the other hand, the frequency fluctuation of the intermediate frequency signal is detected in the frequency discriminator 8 which is composed of delayed lines and a mixer. In the frequency discriminator 8, a stabilizing control signal for suppressing the frequency fluctuation is produced to be supplied through the switch 9 to the first adder 15. In the channel discrimination circuit 10 connected to the demodulator 7, channel discrimination signal is picked out of the demodulated signal, and is supplied to the controller 12, together with signal supplied from the input terminal 13 for selecting one of the 10 channels and signal supplied from the envelope detection circuit 11 for the information of the presence and non-presence of the intermediate frequency signal. The controller 12 produces the sweep signal 23 and the change-over signal 24 dependent on the supplied signals. The sweep signal 23 is a trigger signal for driving the voltage sweep circuit 14 by which the frequency sweep of the local oscillation light source 21 composed of a wavelength variable semiconductor laser is performed, while the change-over signal 24 is a signal for turning the switch 9 on and off in the first control system by which the frequency of the intermediate frequency signal is stabilized, and is a signal for performing the polarization scrambling in the second control system. The sweep signal 23 is supplied from the controller 12 to the voltage sweep circuit 14, output of which is added in the first adder 15 to the control signal for stabilizing the intermediate frequency. Output of the first adder 15 is converted in the current source 18 to a current signal which is then added to a bias current of the local oscillation light source 21. The frequency of the intermediate frequency signal is controlled to be changed dependent on the output of the first adder 15 because frequency of the local oscillation light source 21 is changed dependent on the bias current. In the embodiment, it takes one second to sweep the frequency of the local oscillation light source 21 in the whole frequency band of the 10 channel signal light 1. On the other hand, the change-over signal 24 is supplied to the switch 9 and the oscillator 17, so that the switch 9 is turned on, and output of the oscillator 17 is ceased to be supplied therefrom when the change-over signal is "1", while the switch 9 is turned off, and the output of the oscillator 17 is supplied to the second adder 19 when the change-over signal is "0". The output of the oscillator 17 is added in the second adder 19 to a first output of the maximum value control circuit 16. The first output is a signal for controlling a polarization angle of the local oscillation light 2. Therefore, a signal which is a sinusoidal wave for vibrating the polarization angle of the local oscillation light 2 is supplied from the second adder 19 to the driver 20 when the oscillator 17 is turned on to produce the oscillation signal of, for instance, 10 KHz. Voltage of the polarization controller 22, which is of an electric field rotation type of an optical $LiNbO_3$ waveguide structure, is increased in its output amplitude up to more than 6 V. On the other hand, a second output of the maximum value control circuit 16, which is a signal for controlling an elliptic function of the local oscillation light 2, is supplied to the second driver 25 by which voltage of the polarization controller 22 is increased. The polarization controller 22 comprises first and second regions in which the first region acts as a $\lambda/2$ plate, and the second region acts as a $\lambda/4$ plate, where $\lambda$ is a wavelength of light. In each region, electrodes are provided along a waveguide, so that electric field is applied thereto by 360 degrees In the polarization controller 22, the output of the first driver 20 is applied to the electrode of the first region for the $\lambda/2$ plate, and the output of the second driver 25 is applied to the electrode of the second region for the $\lambda/4$ plate. In accordance with the operation described above, the local oscillation light 2 of the local oscillation light source 21 is controlled to have a predetermined polarization, and the polarization scrambling is conducted in the frequency of 10 KHz (as described in the reports published by the Institute of Electronics Informations and Communications Engineers" 85/2, vol. J68-CNo. 2).

In selecting a predetermined channel from the 10 channels, a signal of the predetermined channel (hereinafter called "input channel") is supplied from the input terminal 13 to the controller 12. It is determined in the controller 12 how far and on which side of high or low frequency the input channel is in regard to the presently selected channel, a signal of which is supplied to the controller 12 from the channel discrimination circuit 10. In accordance with the determination of the controller 12, the sweep signal 23 which is "+1"v in a case where the input channel is on the side of high frequency, and is "−1"v in a case where the input channel is on the side of low frequency is supplied to the voltage sweep circuit 14 together with the change-over signal 24 of "0". As a result, the polarization of the local oscillation light 2 is scrambled, and the frequency thereof is swept in the direction of a predetermined frequency. During the frequency sweep, the output of the envelope detection circuit 11 is monitored by the controller 12 to count the number of channel sweeps. At this time, the local oscillation light 2 is under the polarization scrambling as described above, so that the number of the channels is precisely counted because the intermediate frequencies can be detected in all of the 10 channels. When the intermediate frequency of the input channel is detected in the controller 12, the sweep signal 23 becomes "0"v, and the change-over signal 24 becomes "1". As a result, the voltage sweep circuit 14 holds the presently output voltage so that the frequency sweep of the intermediate frequency signal is no longer performed. Simultaneously, the polarization scrambling of the local oscillation light 2 is stopped, and the frequency stabilization of the intermediate frequency signal begins to operate. A level of the intermediate frequency signal is maximized in accordance with the polarization control signal of the local oscillation light 2 supplied from the maximum value control circuit 16. Consequently, signals of the input channel are obtained from the demodulator 7. As described above, the polarization scrambling is continued until the intermediate frequency becomes a predetermined frequency in accordance with the frequency sweep control of the local oscillation light. When the intermediate frequency becomes a desired value, the polarization scrambling is controlled to stop, and polarizations of the signal light and the local oscillation light are coincided with each other. In the above polarization scrambling, the polarization of the local oscillation light is scrambled in the first embodiment. On the other hand, the polarization of the signal light may be scrambled.

Figure 2:
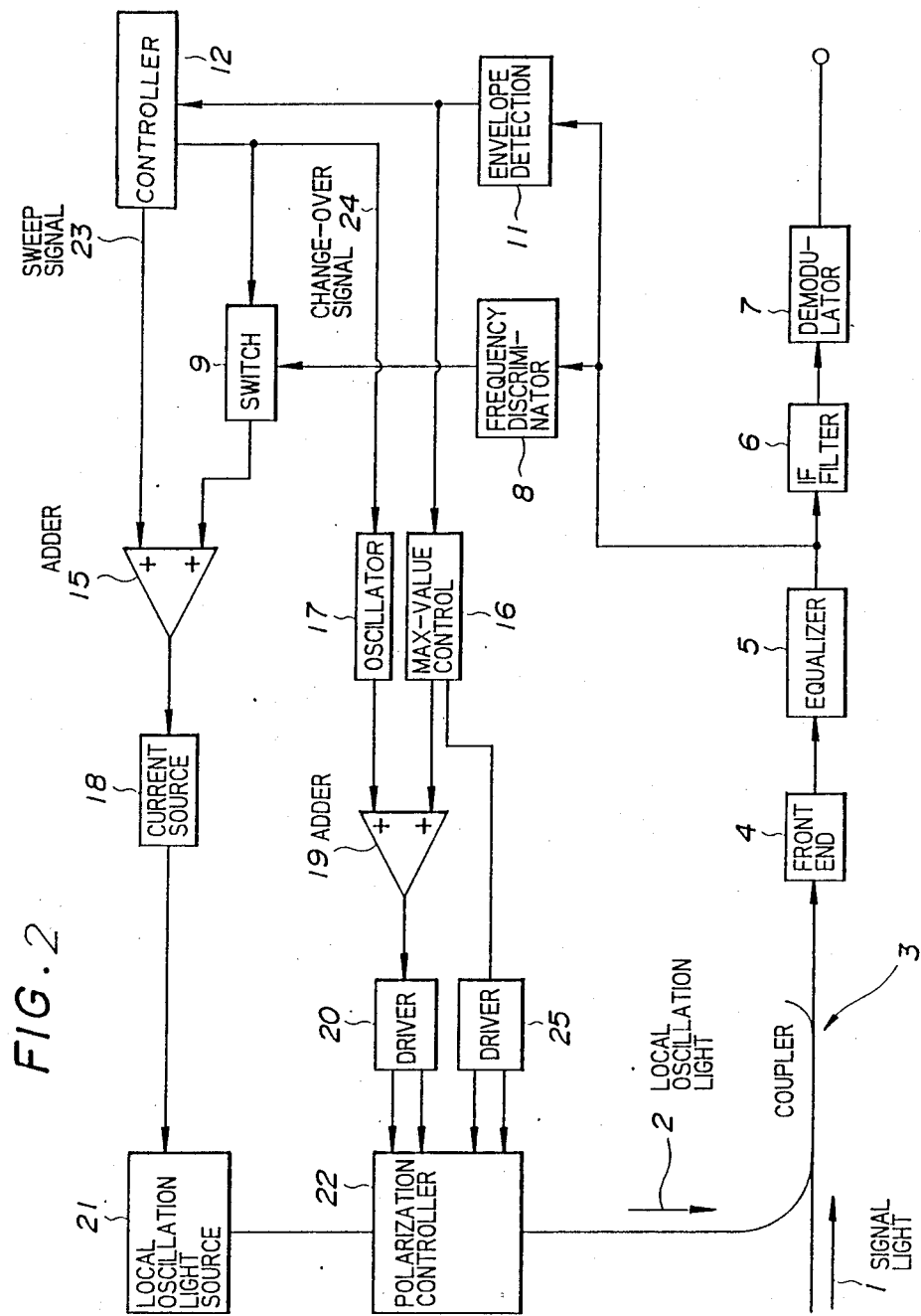
FIG. 2 is a block diagram showing a second embodiment according to the invention.

In FIG. 2, there is shown an optical heterodyne detection apparatus in the second embodiment according to the invention. In the optical heterodyne detection apparatus which is applied to an optical frequency shift keying heterodyne detection communication system using a burst signal, like parts are indicated by like reference numerals in FIG. 2.

In operation, when signal light 1 having a bit rate of 400 Mb/s and a modulation index of 2 is transmitted as a burst signal, the signal light is combined in the optical coupler 3 with local oscillation light 2, and the combined light is received in the front end 4. In a case where the signal light 1 is not transmitted, sweep signal 23 is supplied from the controller 12 to the first adder 15. The sweep signal 23 is a frequency of 100 Hz, and is to sweep frequency of the local oscillation light 2 in a predetermined range of 5 GHz repeatedly. Changeover signal 24 which is supplied from the controller 12 is the same as the change-over signal 24 in the first embodiment. Except for the above, the optical heterodyne detection apparatus as shown in FIG. 2 operates in the same manner as in that of FIG. 1. For instance, the polarization controller 22 is positioned on a light path for the local oscillation light 2 supplied from the local oscillation light source 21. For this structure, when the signal light 1 is not transmitted, the frequency of the local oscillation light 2 is swept in a range of 5 GHz, and the polarization scrambling thereof is performed. When intermediate frequency signal is detected in the envelope detection circuit 11, the frequency sweep and the polarization scrambling of the local oscillation light 2 are stopped, and the frequency stabilization of the intermediate frequency signal and the polarization control begin to be performed. The polarization control is also the same as in the first embodiment. Consequently, frequency of the intermediate frequency signal is pulled into an intermediate frequency band to demodulate base band signals without depending on polarization state of the local oscillation light 2.

The invention may be modified in the following structure. For instance, although the polarization controller is of a waveguide type, it may be of an optical fiber type, a combination type of a λ/2 plate and a λ/4 plate, and so on. Furthermore, although the polarization control and the polarization scrambling are performed in the common polarization controller, a polarization controller and a polarization scrambler may be provided separately. However, the arrangement in the first and second embodiments are most advantageous in regard to the minimization of loss. In a case where a power of the local oscillation light is low, the polarization controller may be positioned on a light path of the signal light.

As described in the first and second embodiments, even if polarizations of the signal light and the local oscillation light are orthogonal to each other, the intermediate frequency is stabilized at a predetermined frequency for the reason why one of the polarizations is scrambled so that beat signal can be detected.

Although the invention has been described with respect to specific embodiment for complete and clear disclosure, the appended claims are not to thus limited but are to be construed as embodying all modification and alternative constructions that may occur to one skilled in the art which fairly fall within the basic teaching herein set forth.

What is claimed is:

1. An optical heterodyne homodyne detection apparatus comprising:
    means for sweeping a frequency of a local oscillation light emmitted from a local oscillation light source in accordance with a frequency sweeping signal,
    means for scrambling polarization of at least one light selected from said local oscillation light and a signal light supplied from an optical transmitter in accordance with a scrambling signal,
    means for controlling a polarization angle of said at least one light,
    means for producing an intermediate frequency signal by combining said local oscillation light and said signal light, and
    a controller for controlling said sweeping means to sweep said frequency of said local oscillation light by varying a level of said frequency sweeping signal applied to said local oscillation light source and to stop the frequency sweeping of said local oscillation light by holding said level of said frequency sweeping signal constant, when a predetermined channel is detected, and controlling said scrambling means to scramble said polarization of said at least one light by applying said scrambling signal to said scrambling means and to stop said polarization scrambling by cutting said scrambling signal simultaneously with said stopping of said frequency sweeping, and further controlling said polarization angle controlling means to control said polarization angle of said at least one light, thereby resulting in the coincidence of polarization between said local oscillation light and said signal light.

2. An optical heterodyne homodyne detection apparatus according to claim 1 further comprising,
    an envelope detection circuit for detecting the presence and non-presence of said intermediate frequency signal, the output of said envelope detection circuit being coupled to said controller,
    a channel discrimination circuit for discriminating channels, the output of said channel discrimination circuit being coupled to said controller, and
    a frequency discriminator for detecting the frequency fluctuation of said intermediate frequency signal, the output of said frequency discriminator being coupled to said local oscillation light source,
    wherein said frequency sweep and said polarization scrambling are controlled in accordance with signal supplied from said envelope detection circuit and said channel discrimination circuit to said controller, and
    said frequency of said intermediate frequency signal is stabilized in accordance with signal supplied from said frequency discriminator to a local oscillation light source for said local oscillation light.

* * * * *